(12) United States Patent
Nakano et al.

(10) Patent No.: US 11,982,555 B2
(45) Date of Patent: May 14, 2024

(54) THERMAL SENSOR DEVICE

(71) Applicant: Hitachi Astemo, Ltd., Hitachinaka (JP)

(72) Inventors: Hiroshi Nakano, Tokyo (JP); Masahiro Matsumoto, Tokyo (JP); Yasuo Onose, Hitachinaka (JP); Kazuhiro Ohta, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 447 days.

(21) Appl. No.: 17/607,441

(22) PCT Filed: Jun. 9, 2020

(86) PCT No.: PCT/JP2020/022619
§ 371 (c)(1),
(2) Date: Oct. 29, 2021

(87) PCT Pub. No.: WO2020/255788
PCT Pub. Date: Dec. 24, 2020

(65) Prior Publication Data
US 2022/0214197 A1 Jul. 7, 2022

(30) Foreign Application Priority Data
Jun. 17, 2019 (JP) .................................. 2019-111695

(51) Int. Cl.
*G01F 1/692* (2006.01)
*G01N 27/18* (2006.01)

(52) U.S. Cl.
CPC ............. *G01F 1/692* (2013.01); *G01N 27/18* (2013.01)

(58) Field of Classification Search
CPC .................................... G01F 1/69; G01F 1/692
See application file for complete search history.

(56) References Cited

U.S. PATENT DOCUMENTS 6,349,596 B1 * 2/2002 Nakada .................. G01F 1/696
73/204.26
6,450,025 B1 9/2002 Wado et al.
(Continued)

FOREIGN PATENT DOCUMENTS

JP 11-271123 A 10/1999
JP 2003-042824 A 2/2003
(Continued)

OTHER PUBLICATIONS

Sakuma, Thermal Fluid Flow Rate Sensor and Manufacturing Method Thereof, Sep. 2013, FIT Computer Translation (Year: 2013).*
International Search Report, PCT/JP2020/022619, Oct. 6, 2020.

*Primary Examiner* — Erika J. Villaluna
(74) *Attorney, Agent, or Firm* — Volpe Koenig

(57) ABSTRACT

A thermal sensor device capable of maintaining measurement accuracy for a long period by suppressing plastic deformation due to thermal expansion of the heat generating resistor and reducing resistance change of the heat generating resistor, includes: a substrate having an opening; and a diaphragm having a structure in which a lower film, a heat generating resistor, and an upper film are stacked so as to bridge the opening, in which a film thickness of the lower film is larger than a film thickness of the upper film, an average thermal expansion coefficient of the lower film is larger than an average thermal expansion coefficient of the upper film, the lower film includes a plurality of films having different thermal expansion coefficients, and a film having a largest thermal expansion coefficient among the plurality of films is formed below a thickness center of the lower film.

5 Claims, 5 Drawing Sheets

(56) References Cited

U.S. PATENT DOCUMENTS

2003/0019290 A1   1/2003  Iwaki et al.
2010/0139391 A1   6/2010  Sakuma

FOREIGN PATENT DOCUMENTS

| JP | 2010-133897 A | 6/2010 |
| JP | 2013-190320 A | 9/2013 |
| JP | 2015-210201 A | 11/2015 |

* cited by examiner

THERMAL SENSOR DEVICE

TECHNICAL FIELD

The present invention relates to a thermal sensor device in which a heat generating resistor is formed on a diaphragm.

BACKGROUND ART

As a background art of this technical field, there is PTL 1. PTL 1 discloses an air flow sensor capable of increasing the film thicknesses of a lower thin film and an upper thin film holding a heat generating resistor to increase the mechanical strength and capable of reducing the overall warpage. This air flow sensor has a thin film heat generating portion (hereinafter, a diaphragm) having a structure in which a lower thin film, a heater layer, and an upper thin film are stacked so as to bridge a cavity portion formed in a silicon substrate. Each of the lower thin film and the upper thin film has a configuration in which a compressive stress film and a tensile stress film are combined, and the lower thin film and the upper thin film are stacked so as to have a symmetrical structure with the heater layer interposed therebetween. The compressive stress film is made of a silicon oxide film having good adhesion, and the tensile stress film is made of a silicon nitride film having good moisture resistance. By forming the lower thin film and the upper thin film in a symmetrical structure, it is possible to cancel the warpage moment and suppress the warpage of the entire diaphragm. As a result, in the air flow sensor of PTL 1, the film thicknesses of the lower thin film and the upper thin film can be increased, and the mechanical strength of the diaphragm is improved.

As a background art of this technical field, there is PTL 2. In PTL 2, in an insulating film below a heat generating resistor, a film having a compressive stress and a film having a tensile stress are alternately arranged, and two or more films having a tensile stress film are arranged. This reduces the deflection of the diaphragm.

CITATION LIST

Patent Literature

PTL 1: JP 11-271123 A
PTL 2: JP 2010-133897 A

SUMMARY OF INVENTION

Technical Problem

In order to detect minute changes in the flow and concentration of gas, it is necessary to increase the temperature of the heat generating resistor to increase the detection sensitivity. For example, in the air flow sensor, the heat generating resistor is heated to a high temperature of about 200° C. In order to measure a gas concentration such as humidity, the heat generating resistor is heated to about 500° C.

When the heat generating resistor is heated, the temperature of the diaphragm rises and thermal expansion occurs. Strain occurs due to thermal expansion, and if this state continues for a long period of time, plastic deformation occurs in the heat generating resistor, and the resistance value changes. The change in the resistance value changes the heating temperature, and an error occurs in the measurement value.

In PTLs 1 and 2, it is possible to reduce the warpage of the diaphragm at room temperature, but the diaphragm is expanded by heating the heat generating resistor. The influence of this expansion on the heat generating resistor was not taken into consideration, and the consideration was not sufficient.

In order to reduce the resistance change of the heat generating resistor caused by continuing the high temperature state for a long period of time, it is effective to suppress the expansion of the heat generating resistor and reduce the strain. In order to reduce the strain due to temperature change, it is desirable that the heat generating resistor is covered with a silicon oxide film having a small thermal expansion coefficient, and a silicon nitride film having a large thermal expansion coefficient is not used as much as possible. However, with such a configuration, a difference in thermal expansion coefficient from the silicon substrate holding the diaphragm increases, wrinkles occur in the diaphragm, and the diaphragm is deformed. When the diaphragm is deformed, cracks are likely to occur in the diaphragm, and mechanical reliability is impaired.

The present invention has been made in view of the above problems, and an object thereof is to provide a thermal sensor device capable of maintaining measurement accuracy for a long period of time by suppressing plastic deformation due to thermal expansion of a heat generating resistor and reducing a resistance change of the heat generating resistor.

Solution to Problem

In order to achieve the above object, the present invention provides a thermal sensor device including: a substrate having an opening; and a diaphragm having a structure in which a lower stacked film, a heat generating resistor, and an upper stacked film are stacked so as to bridge the opening, in which a film thickness of the lower stacked film is larger than a film thickness of the upper stacked film, an average thermal expansion coefficient of the lower stacked film is larger than an average thermal expansion coefficient of the upper stacked film, the lower stacked film includes a plurality of films having different thermal expansion coefficients, and a film having a largest thermal expansion coefficient among the plurality of films is formed below a thickness center of the lower stacked film.

According to the present invention configured as described above, since the film thickness of the lower stacked film is larger than the film thickness of the upper stacked film, the heat generating resistor is disposed on the upper layer side of the center of the thickness of the diaphragm. In addition, since the average thermal expansion coefficient of the lower stacked film is larger than the average thermal expansion coefficient of the upper stacked film, bending deformation occurs in the diaphragm when the heat generating resistor is heated. Therefore, on the upper layer side of the center of the thickness of the diaphragm, compressive strain due to the bending deformation of the diaphragm occurs in addition to elongation strain due to the thermal expansion of the diaphragm. As a result, the elongation strain of the heat generating resistor disposed on the upper layer side of the center of the thickness of the diaphragm is reduced by the compressive strain due to the bending deformation of the diaphragm. By the above action, plastic deformation due to the thermal expansion of the heat generating resistor is suppressed, and a resistance change of the heat generating resistor is reduced, so that measurement accuracy of the thermal sensor device can be maintained for a long period of time.

Advantageous Effects of Invention

According to the thermal sensor device of the present invention, it is possible to maintain measurement accuracy for a long period of time by suppressing plastic deformation due to thermal expansion of the heat generating resistor and reducing a resistance change of the heat generating resistor.

DESCRIPTION OF EMBODIMENTS

Hereinafter, examples according to the present invention will be described. In each of the embodiments, as an example, a device that is attached to an intake passage of an engine and measures the flow rate of intake air flowing through the intake passage will be described. However, the present invention can also be applied to a gas sensor that measures the humidity and hydrogen concentration of gas from the change in the heat radiation amount and temperature of the heat generating resistor.

First Embodiment

Figure 1:
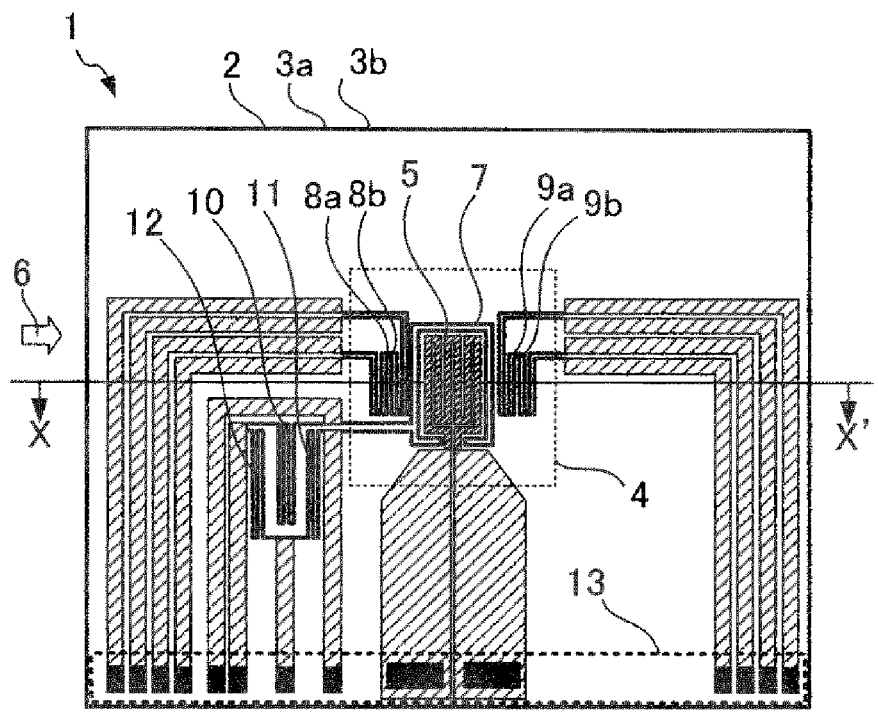
FIG. 1 is a plan view according to an embodiment of a sensor element used in a thermal sensor device of the present invention.

A first embodiment according to the present invention will be described below. A configuration of a sensor element 1 of a thermal flowmeter according to the present embodiment will be described with reference to FIG. 1. A substrate 2 of the sensor element 1 is made of a material having a high thermal conductivity such as silicon. Then, a lower stacked film 3a and an upper stacked film 3b are formed on the substrate 2. A heat generating resistor 5 is sandwiched between the lower stacked film 3a and the upper stacked film 3b, a heating temperature sensor 7 that detects the heating temperature of the heat generating resistor 5 around the heat generating resistor 5, and upstream side temperature sensors 8a and 8b and downstream side temperature sensors 9a and 9b are formed on both sides of the heating temperature sensor 7. The upstream side temperature sensors 8a and 8b are disposed on the upstream side of the flow of an air flow 6 with respect to the heat generating resistor 5, and the downstream side temperature sensors 9a and 9b are disposed on the downstream side of the flow of the air flow 6 with respect to the heat generating resistor 5. On the lower stacked film 3a, temperature-sensitive resistors 10, 11, and 12 whose resistance values change according to the temperature of the air flow 6 are disposed. Then, the outermost surface of the sensor element 1 is covered with the upper stacked film 3b. The upper stacked film 3b performs electrical insulation and also serves as a protective film. Further, a part of the substrate 2 is removed from the back surface by etching or the like to form a diaphragm 4 as a thin film heat generating portion.

In the above configuration, the temperature of the heat generating resistor 5 is detected by the heating temperature sensor 7, heating is controlled so as to be a constant temperature higher than the temperature of the air flow 6, and the air flow rate is detected from the temperature difference between the upstream side temperature sensors 8a and 8b and the downstream side temperature sensors 9a and 9b generated by the air flow 6.

The heat generating resistor 5, the heating temperature sensor 7, the upstream side temperature sensors 8a and 8b, the downstream side temperature sensors 9a and 9b, and the temperature-sensitive resistors 10, 11, and 12 are formed of a material whose resistance value changes depending on the temperature. For example, a metal material having a large temperature coefficient of resistance, such as platinum, molybdenum, tungsten, or a nickel alloy, may be used. In addition, the lower stacked film 3a and the upper stacked film 3b are formed in a thin film shape having a thickness of about 2 microns by silicon oxide ($SiO_2$) or silicon nitride ($Si_3N_4$), and have a structure in which a thermal insulation effect can be obtained.

An electrode pad 13 in which a plurality of electrodes for connecting the resistors constituting the heat generating resistor 5, the heating temperature sensor 7, the upstream side temperature sensors 8a and 8b, the downstream side temperature sensors 9a and 9b, and the temperature-sensitive resistors 10, 11, and 12 to the drive/detection circuit are formed is provided at an end portion of the sensor element 1. The electrode pad 13 is made of aluminum or the like. In addition, wiring for connecting the heat generating resistor 5 and each temperature sensor to the electrode pad 13 is formed.

Figure 2:
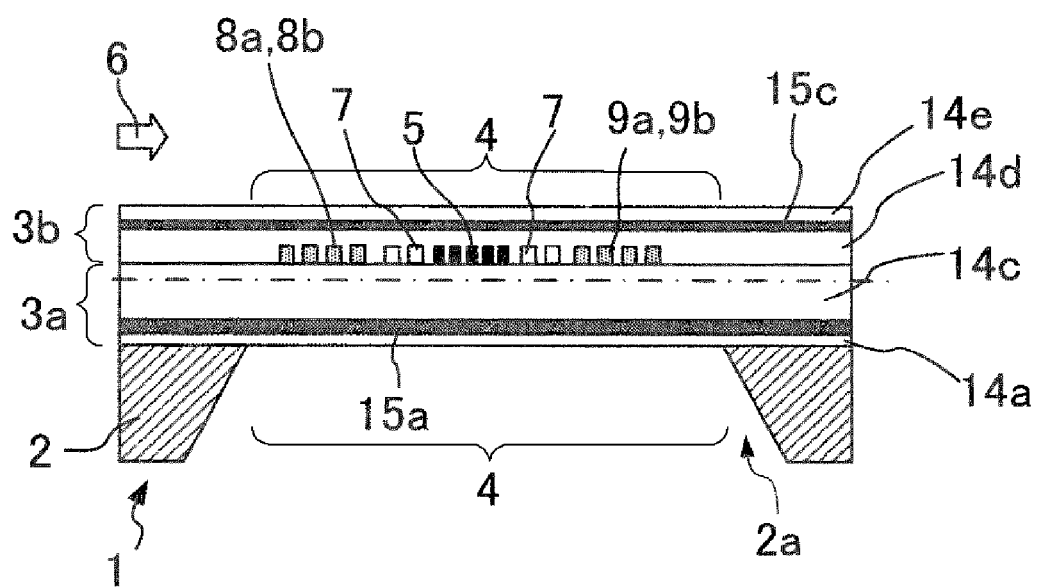
FIG. 2 is a cross-sectional view illustrating a cross section taken along line X-X' in FIG. 1.

FIG. 2 illustrates a cross-sectional structure of the sensor element 1. The lower stacked film 3a is formed on the substrate 2. The lower stacked film 3a has a configuration in which silicon oxide films and silicon nitride films are alternately stacked. A silicon oxide film 14a, a silicon nitride film 15a, and a silicon oxide film 14c obtained by thermally oxidizing a Si substrate are formed in order from the lower layer. The silicon oxide films 14a and 14c and the silicon nitride film 15a can be formed by a CVD method. The heat generating resistor 5, the heating temperature sensor 7, the upstream side temperature sensors 8a and 8b, and the downstream side temperature sensors 9a and 9b are formed on the lower stacked film 3a. The upper stacked film 3b is formed on these layers. On the upper stacked film, a silicon oxide film 14d, a silicon nitride film 15c, and a silicon oxide film 14e are formed in order from the bottom. The silicon oxide films 14d to 14e and the silicon nitride film 15c can be formed by a plasma CVD method.

In the present embodiment, the silicon oxide films and silicon nitride films having different thermal expansion coefficients are used as the materials of the lower stacked film 3a, but the materials are not limited to these films For example, the thermal expansion coefficient of the silicon oxide film is $0.5 \times 10^{-6}$ (/° C.), and the thermal expansion coefficient of the silicon nitride film is about $3.6 \times 10^{-6}$ (/° C.). In addition to these films, materials having different thermal expansion coefficients can be used, and for example, aluminum nitride or the like can be used instead of a silicon nitride film. The thermal expansion coefficient of aluminum nitride is about $5.7 \times 10^{-6}$ (/° C.).

In the present embodiment, the silicon oxide film and the silicon nitride film are used as the materials of the upper stacked film 3b, but the materials are not limited to these films. In the implementation of the present invention, an average thermal expansion coefficient of the upper stacked film 3b may be smaller than an average thermal expansion coefficient of the lower stacked film 3a. Therefore, it is not necessary to use two kinds of films such as a silicon oxide film and a silicon nitride film, and the silicon oxide film may be used alone. The average thermal expansion coefficient is defined by a weighted average of the film thicknesses of the thermal expansion coefficients of the respective films.

Specific film thicknesses of the silicon oxide film and the silicon nitride film described above will be described later together with operations and effects according to the present invention.

Next, a drive/detection circuit of the sensor element 1 will be described.

Figure 3:
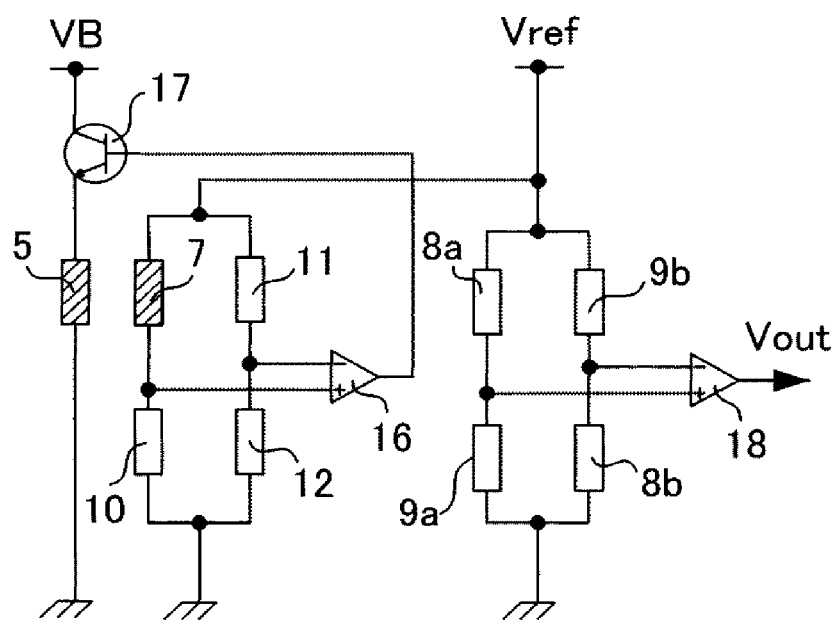
FIG. 3 is a circuit diagram illustrating an embodiment of a drive circuit (circuit configuration) of the thermal sensor device of the present invention.

As illustrated in FIG. 3, a bridge circuit in which a series circuit including the heating temperature sensor 7 and the temperature-sensitive resistor 10 whose resistance value changes according to the temperature of the heat generating resistor 5 and a series circuit including the temperature-sensitive resistor 11 and the temperature-sensitive resistor 12 are connected in parallel is formed, and a reference voltage Vref is applied to each series circuit. An intermediate voltage of these series circuits is extracted and connected to an amplifier 16. The output of the amplifier 16 is connected to the base of the transistor 17. The collector of the transistor 17 is connected to a power supply VB, and an emitter is connected to the heat generating resistor 5 to constitute a feedback circuit. As a result, the temperature Th of the heat generating resistor 5 is controlled to be higher than the temperature Ta of the air flow 6 by the temperature $\Delta Th$ (=Th−Ta).

Then, a bridge circuit in which a series circuit including the upstream side temperature sensor 8a and the downstream side temperature sensor 9a and a series circuit including the downstream side temperature sensor 9b and the upstream side temperature sensor 8b are connected in parallel is formed, and the reference voltage Vref is applied to the bridge circuit. When a temperature difference occurs between the upstream side temperature sensors 8a and 8b and the downstream side temperature sensors 9a and 9b due to the air flow, the resistance balance of the bridge circuit changes, and a differential voltage occurs. An output Vout corresponding to the air flow rate is obtained by detecting the differential voltage via an amplifier 18.

Hereinafter, the resistance change of the heat generating resistor 5 in the thermal sensor device as described above will be described. The resistance change occurs not only in the heat generating resistor 5 but also in the resistors formed on the diaphragm 4 such as the heating temperature sensor 7, the upstream side temperature sensors 8a and 8b, and the downstream side temperature sensors 9a and 9b.

In particular, the heat generating resistor 5 and the heating temperature sensor 7 having a high temperature have a large resistance change, and the effect obtained by the present invention is high.

In order to reduce the resistance change of the heat generating resistor 5, it has been found by experiments of the inventors that it is preferable that the lower stacked film 3a and the upper stacked film 3b on which the heat generating resistor 5 is formed be films having a small thermal expansion coefficient. That is, it is necessary to increase the film thickness of the silicon oxide and reduce the film thickness of the silicon nitride film.

Figure 4:
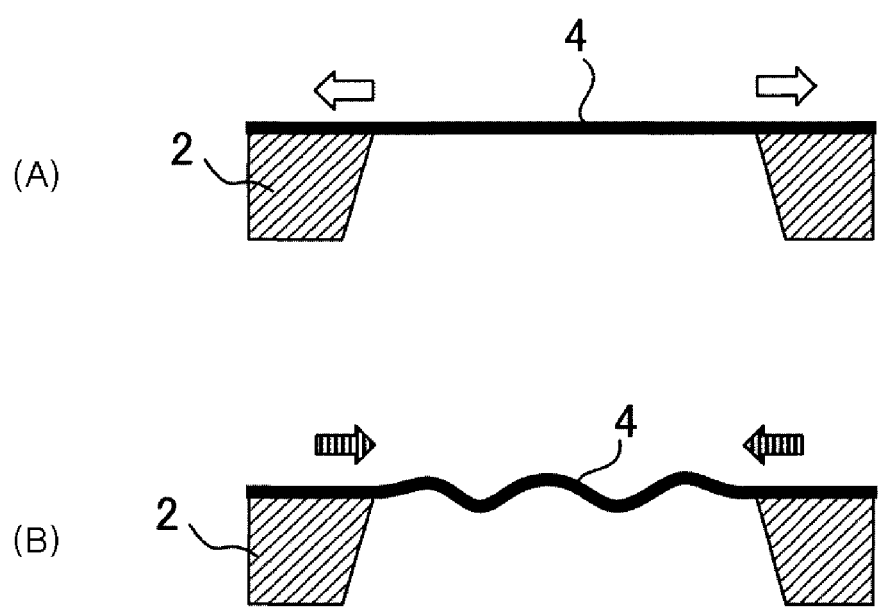
FIG. 4 is a view illustrating a warpage shape in a case where a diaphragm is tensile and a warpage shape in a case where the diaphragm is compressive.

However, when the diaphragm 4 is formed of silicon oxide, the diaphragm 4 is deformed. FIG. 4 is a view illustrating a warpage shape in a case where a diaphragm 4 is tensile and a warpage shape in a case where the diaphragm is compressive.

FIG. 4(A) is a cross-sectional view conceptually illustrating deformation of a sensor element used in the thermal sensor device, and is a view illustrating a cross-sectional shape of the diaphragm 4 in a case where a film thickness is set such that a combined stress of a stacked film forming the diaphragm 4 is tensile. In FIG. 4(A), a silicon oxide film and a silicon nitride film are stacked to form the diaphragm 4. Each film thickness is set so that the combined stress of the silicon oxide film and the silicon nitride film is tensile. In this case, as illustrated in FIG. 4(A), the diaphragm 4 has a flat shape and can be favorably manufactured.

FIG. 4(B) is a view illustrating a cross-sectional shape of the diaphragm 4 in a case where the film thickness is set so that the combined stress of the stacked film forming the diaphragm 4 is compressive. In FIG. 4(B), the respective film thicknesses are set so that the combined stresses of the silicon oxide film and the silicon nitride film are compressive. When the ratio of the silicon oxide film of the diaphragm 4 is increased to make the diaphragm 4 compressive, wrinkles are generated in the diaphragm 4, and the diaphragm 4 is deformed as illustrated in the drawing.

From the above, since the film configuration of the diaphragm 4 needs to be formed so as to have tensile properties, it is necessary to provide a silicon nitride film having a predetermined thickness so as to obtain a tensile stress.

Since it is necessary to provide the silicon nitride film with a predetermined thickness as described above, reduction of the thermal expansion coefficient of the diaphragm 4 is limited. An object of the present invention is to satisfy this constraint and suppress distortion of the heat generating resistor 5 due to expansion of the diaphragm 4. According to the present invention, the expansion of the heat generating resistor 5 can be suppressed without changing the film thickness ratio between the silicon nitride film and the silicon oxide film of the entire diaphragm 4. Hereinafter, specific examples will be described.

Figure 5:
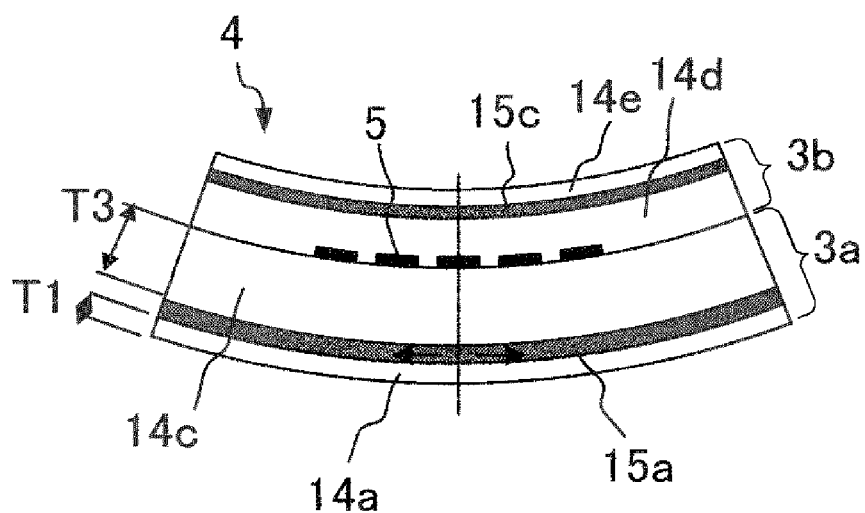
FIG. 5 is an enlarged cross-sectional view of a heat generator in an embodiment of a sensor element according to the present invention.

FIG. 5 is a cross-sectional view illustrating deformation when the heat generating resistor 5 of the sensor element 1 in FIG. 2 is heated. On the lower stacked film 3a, the silicon oxide film 14a, the silicon nitride film 15a, and the silicon oxide film 14c are formed in this order from the lower layer. Here, in the lower stacked film 3a, a film thickness T1 of the silicon oxide film 14a on the lower layer side and a film thickness T3 of the silicon oxide film on the upper layer side are formed so as to satisfy T1<T3.

As a result, the silicon nitride film 15a having a large thermal expansion coefficient is disposed on the lower layer side. That is, the lower stacked film 3a includes the silicon oxide films 14a and 14c and the silicon nitride film 15a having different thermal expansion coefficients, and the silicon nitride film 15a having the largest thermal expansion coefficient among these films is formed on the lower layer side with respect to the thickness center of the lower stacked film 3a. With this configuration, when the heat generating resistor 5 is heated, the lower layer side of the lower stacked film 3a greatly expands, and bending moment acting on the diaphragm 4 increases, so that bending strain generated in the diaphragm 4 can be further increased.

Figure 6:
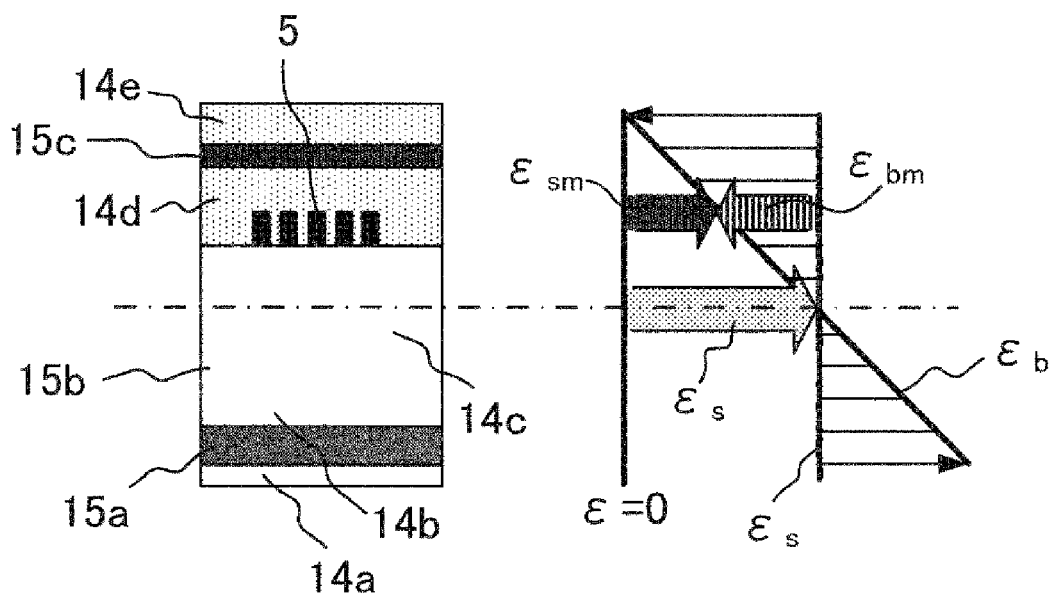
FIG. 6 is a diagram illustrating distortion in a cross-sectional direction of a heat generator in an embodiment of a sensor element according to the present invention.

Hereinafter, the effect of increasing the bending strain will be described. FIG. 6 illustrates strain inside the film of the diaphragm 4 generated when the heat generating resistor 5 is heated in the configuration of the present invention. When the heat generating resistor 5 is heated, elongation strain es is generated according to the average thermal expansion coefficient of the entire film constituting the diaphragm 4. In addition to this, a difference in the thermal expansion coefficient between the upper layer side and the lower layer side occurs due to asymmetry of the film configuration, so that bending strain eb is generated. In the bending deformation, the compressive strain is generated on the inner peripheral side, and the elongation strain is generated on the outer peripheral side. Since the heat generating resistor 5 is disposed on the inner peripheral side in the bending deformation, that is, on the upper layer side of the center of the thickness of the diaphragm 4, the compressive strain ebm acts on the strain caused by the bending strain eb. The strain esm of a heating element is a value obtained by offsetting the elongation strain es from the compressive strain ebm. As a result, the elongation strain of the heating element can be reduced, the expansion and contraction of the heating element accompanying the change in temperature can be suppressed, and the resistance change of the heating element due to the expansion and contraction can be reduced.

In the present embodiment, there is provided a thermal sensor device 1 including: a substrate 2 having an opening 2a; and a diaphragm 4 having a structure in which a lower stacked film 3a, a heat generating resistor 5, and an upper stacked film 3b are stacked so as to bridge the opening 2a, in which a film thickness of the lower stacked film 3a is larger than a film thickness of the upper stacked film 3b, an average thermal expansion coefficient of the lower stacked film 3a is larger than an average thermal expansion coefficient of the upper stacked film 3b, the lower stacked film 3a includes a plurality of films 14a, 15a, and 14c having different thermal expansion coefficients, and the film 15a having a largest thermal expansion coefficient among the plurality of films 14a, 15a, and 14c is formed below a thickness center of the lower stacked film 3a.

According to the embodiment configured as described above, since the film thickness of the lower stacked film 3a is larger than the film thickness of the upper stacked film 3b, the heat generating resistor 5 is disposed on the upper layer side of the center of the thickness of the diaphragm 4. In addition, since the average thermal expansion coefficient of the lower stacked film 3a is larger than the average thermal expansion coefficient of the upper stacked film 3b, bending deformation occurs in the diaphragm 4 when the heat generating resistor 5 is heated. Therefore, on the upper layer side of the center of the thickness of the diaphragm 4, compressive strain ebm due to the bending deformation of the diaphragm 4 occurs in addition to elongation strain es due to the thermal expansion of the diaphragm 4. As a result, the elongation strain of the heat generating resistor 5 disposed on the upper layer side of the center of the thickness of the diaphragm 4 is reduced by the compressive strain ebm due to the bending deformation of the diaphragm 4. By the above action, plastic deformation due to the thermal expansion of the heat generating resistor 5 is suppressed, and a resistance change of the heat generating resistor 5 is reduced, so that measurement accuracy of the thermal sensor device 1 can be maintained for a long period of time.

In addition, a silicon oxide film and a silicon nitride film are alternately formed on the lower stacked film 3a, and the film thickness T1 of the silicon oxide film 14a as the lowermost layer of the lower stacked film 3a is smaller than the film thickness T3 of the silicon oxide film 14c as the uppermost layer of the lower stacked film 3a.

As a result, the silicon nitride film 15a having a large thermal expansion coefficient is formed closer to the lower layer side from the center of the thickness of the lower stacked film 3a. With this configuration, when the heat generating resistor 5 is heated, the lower layer side of the lower stacked film 3a greatly expands, and bending moment acting on the diaphragm 4 increases, so that bending strain generated in the diaphragm 4 can be further increased.

In addition, the upper stacked film 3b includes a silicon oxide film and a silicon nitride film, and the film thickness of the silicon nitride film 15c included in the upper stacked film 3b is smaller than the film thickness of the silicon nitride film 15a included in the lower stacked film 3a. As a result, the thermal expansion coefficient of the upper stacked film 3b can be further reduced, and the thermal expansion coefficient of the lower layer side of the diaphragm 4 can be increased. With this configuration, when the heat generating resistor 5 is heated, the lower layer side of the lower stacked film 3a greatly expands, so that the bending moment increases, and a larger bending strain can be generated in the diaphragm 4.

Furthermore, since the heat generating resistor 5 is disposed between the two silicon nitride films 15c and 15a, oxidation of the heat generating resistor 5 can be prevented.

Second Embodiment

A second embodiment according to the present invention will be described below. The same reference numerals are given to the same configurations as those of the first embodiment, and the description thereof will be omitted.

Figure 7:
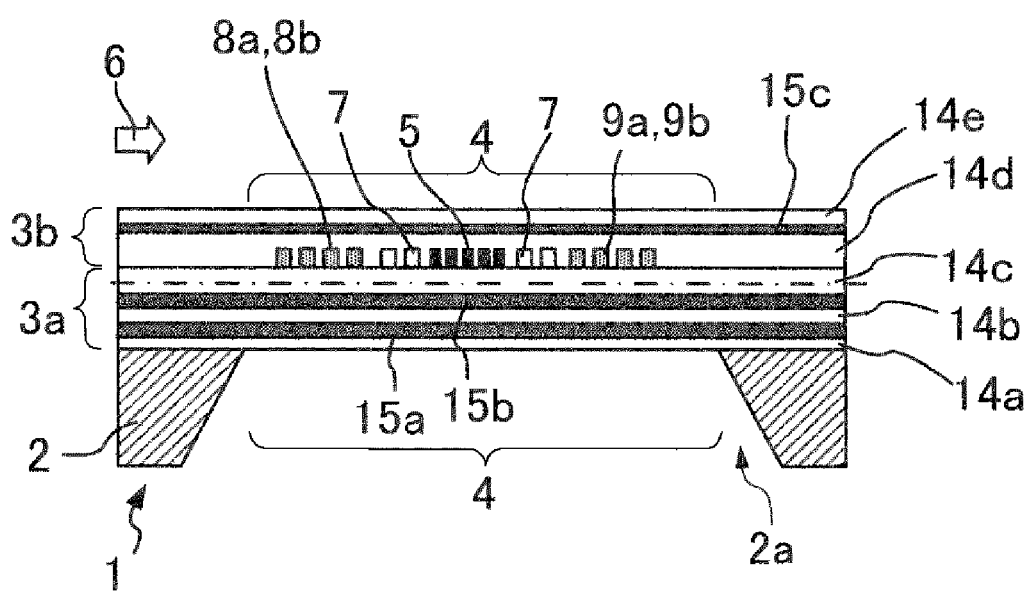
FIG. 7 is a cross-sectional view according to an embodiment of a sensor element used in the thermal sensor device of the present invention.

In the present embodiment, a configuration in which a plurality of silicon nitride films are provided on the lower stacked film 3a will be described. FIG. 7 illustrates a cross-sectional structure of the sensor element 1. The lower stacked film 3a is formed on the substrate 2. The lower stacked film 3a has a configuration in which silicon oxide films and silicon nitride films are alternately stacked. A silicon oxide film 14a, a silicon nitride film 15a, a silicon oxide film 14b, a silicon nitride film 15b, and a silicon oxide film 14c obtained by thermally oxidizing a Si substrate are formed in order from the lower layer. The silicon oxide films 14a to 14c and the silicon nitride films 15a and 15b can be formed by a CVD method. The heat generating resistor 5, the heating temperature sensor 7, the upstream side temperature sensors 8a and 8b, and the downstream side temperature sensors 9a and 9b are formed on the lower stacked film 3a. The upper stacked film 3b is formed on these layers. On the upper stacked film 3b, a silicon oxide film 14d, a silicon nitride film 15c, and a silicon oxide film 14e are formed in order from the bottom. The silicon oxide films 14d to 14e and the silicon nitride film 15c can be formed by a plasma CVD method.

In the present embodiment, the silicon oxide film and the silicon nitride film are used as the materials of the upper stacked film 3b, but the materials are not limited to these films. Also in the present embodiment, the average thermal expansion coefficient of the upper stacked film 3b may be configured not to exceed the average thermal expansion coefficient of the lower stacked film 3a. Therefore, it is not necessary to use two kinds of films such as a silicon oxide film and a silicon nitride film, and the silicon oxide film may be used alone.

Also in the present embodiment, the silicon oxide film and the silicon nitride film are used for the lower stacked film 3a, but materials having different thermal expansion coefficients may be used in addition to these films. For example, aluminum nitride or the like can be used instead of a silicon nitride film.

FIG. 7 is a cross-sectional view illustrating deformation when the heat generating resistor 5 of the sensor element 1 in FIG. 5 is heated. Here, in the lower stacked film 3a, the film thickness T1 of the silicon oxide film 14a on the lowermost layer side and the film thickness T3 of the silicon oxide film on the uppermost layer side are formed so as to satisfy T1<T3. As a result, the silicon nitride films 15a and 15b having a large thermal expansion coefficient are formed closer to the lower layer side than the thickness center of the lower stacked film 3a. With this configuration, when the heat generating resistor 5 is heated, the lower layer side of the lower stacked film 3a greatly expands, and bending moment acting on the diaphragm 4 increases, so that bending strain generated in the diaphragm 4 can be further increased.

In the present embodiment, a more effective configuration will be described below.

Figure 8:
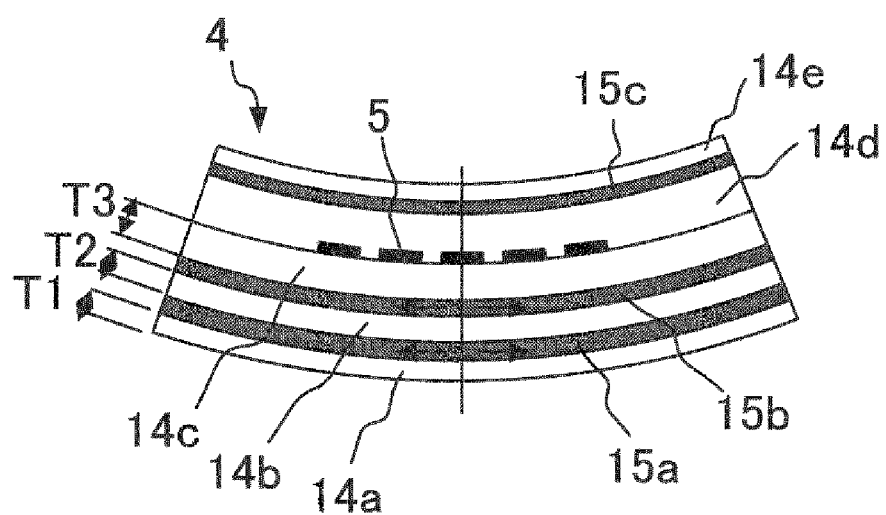
FIG. 8 is a cross-sectional view according to an embodiment of a sensor element used in the thermal sensor device of the present invention.

In the lower stacked film 3a illustrated in FIG. 8, when the film thickness of the silicon oxide film 14b sandwiched between the plurality of silicon nitride films is T2, T3>T2 is formed. As a result, the silicon nitride film 15b is formed on the lower layer side, when the heat generating resistor 5 is heated, the lower layer side of the lower stacked film 3a greatly expands, and bending moment acting on the diaphragm 4 increases, so that bending strain generated in the diaphragm 4 can be further increased.

Figure 9:
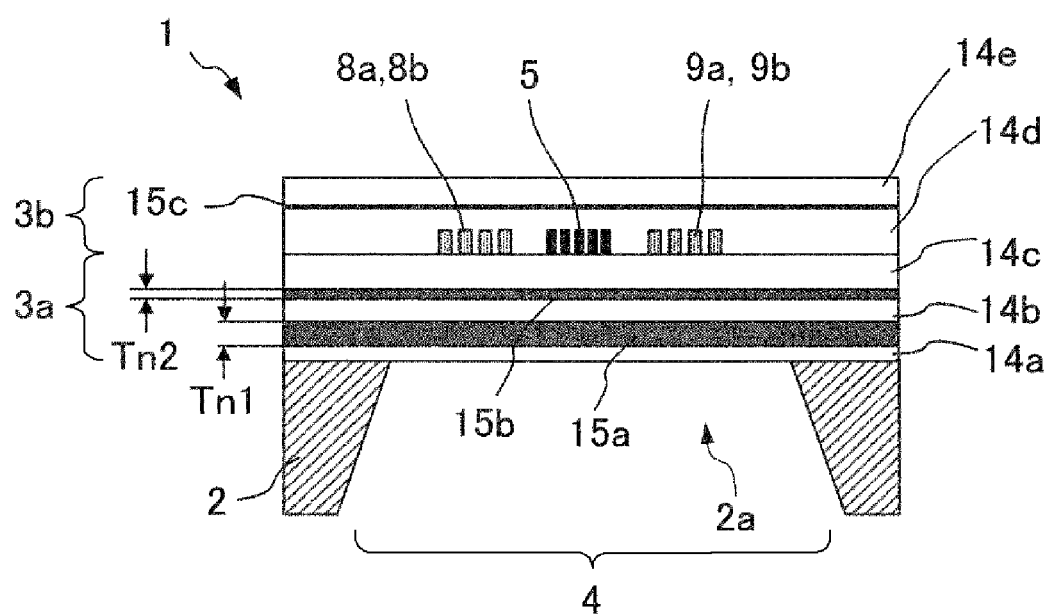
FIG. 9 is a cross-sectional view according to an embodiment of a sensor element used in the thermal sensor device of the present invention.

Next, in the present embodiment, a configuration in which the effect of the present invention can be further obtained for a plurality of silicon nitride films included in the lower stacked film 3a is illustrated in FIG. 9. In FIG. 9, the lowermost silicon nitride film 15a among the plurality of silicon nitride films 15a and 15b included in the lower stacked film is formed to be the thickest. That is, the thickness of the silicon nitride film 15b is reduced by the thickness of the silicon nitride film 15a. As a result, it is possible to increase the expansion of the lower layer side when the heat generating resistor 5 is heated without changing the combined thickness of the silicon nitride film of the entire film. With this configuration, when the heat generating resistor 5 is heated, the lower layer side of the lower stacked film 3a greatly expands, and bending moment acting on the diaphragm 4 increases, so that bending strain generated in the diaphragm 4 can be further increased.

Next, in the present embodiment, a configuration in which the effect of the present invention can be further obtained for the silicon nitride films included in the upper stacked film 3b is described. In FIG. 9, the upper stacked film 3b includes a silicon oxide film 14d and 14e and a silicon nitride film 15c, and the film thickness of the silicon nitride film 15c included in the upper stacked film 3b is smaller than the film thickness of the silicon nitride films 15a and 15b included in the lower stacked film 3a. As a result, the thermal expansion coefficient of the upper stacked film 3b can be further reduced, and the thermal expansion coefficient of the lower layer side of the diaphragm 4 can be increased. With this configuration, when the heat generating resistor 5 is heated, the lower layer side of the lower stacked film 3a greatly expands, so that the bending moment increases, and a larger bending strain can be generated in the diaphragm 4.

In the present embodiment, the configuration in which two silicon nitride films included in the lower stacked film 3a are formed has been described, but the effect of the present invention can also be obtained by a configuration in which three layers are formed. In addition, when any of the plurality of silicon nitride films included in the lower stacked film 3a is formed to be extremely thin, this thin silicon nitride film has a small influence on expansion of the entire diaphragm. Therefore, such a remarkably thin film (for example, up to 20 nm, or 1/10 or less of the total film thickness of the entire silicon nitride) is not to be regarded.

In the present embodiment, at least two silicon nitride films are formed on the lower stacked film 3a, and the film thickness T2 of the silicon oxide film 14b sandwiched between the two silicon nitride films 15a and 15b of the lower stacked film is smaller than the film thickness T3 of the silicon oxide film 14c of the uppermost layer of the lower stacked film 3a.

According to the present embodiment configured as described above, the silicon nitride film 15b is formed on the lower layer side, when the heat generating resistor 5 is heated, the lower layer side of the lower stacked film 3a greatly expands, and bending moment acting on the diaphragm 4 increases, so that bending strain generated in the diaphragm 4 can be further increased.

Furthermore, in the modification (illustrated in FIG. 9) of the present embodiment, a film thickness Tn1 of the lowermost silicon nitride film 15a among the plurality of silicon nitride films 15a and 15b included in the lower stacked film 3a is the largest. As a result, it is possible to increase the expansion of the lower layer side when the heat generating resistor 5 is heated without changing the combined thickness Tn1+Tn2 of the silicon nitride films 15a and 15b of the entire film. With this configuration, when the heat generating resistor 5 is heated, the lower layer side of the lower stacked film 3a greatly expands, and bending moment acting on the diaphragm 4 increases, so that bending strain generated in the diaphragm 4 can be further increased.

Although the embodiments of the present invention have been described in detail above, the present invention is not limited to the above-described embodiments, and includes various modifications. For example, the above-described embodiments have been described in detail in order to describe the present invention in an easy-to-understand manner, and are not necessarily limited to those having all the described configurations. In addition, a part of a configuration of another embodiment can be added to a configuration of a certain embodiment, and a part of the configuration of a certain embodiment can be deleted or replaced with a part of another embodiment.

REFERENCE SIGNS LIST 1 sensor element (thermal sensor device)
2 substrate
2a opening
3a lower stacked film
3b upper stacked film
4 diaphragm
5 heat generating resistor
6 air flow
7 heating temperature sensor
8a, 8b upstream side temperature sensor 9a, 9b downstream side temperature sensor
10, 11, 12 temperature-sensitive resistor
13 electrode pad
14a, 14b, 14c, 14d, 14e silicon oxide film
15a, 15b, 15c silicon nitride film
16 amplifier
17 transistor
18 amplifier

The invention claimed is:

1. A thermal sensor device comprising:
a substrate having an opening; and
a diaphragm having a structure in which a lower stacked film, a heat generating resistor, and an upper stacked film are stacked so as to bridge the opening,
wherein a film thickness of the lower stacked film is larger than a film thickness of the upper stacked film, an average thermal expansion coefficient of the lower stacked film is larger than an average thermal expansion coefficient of the upper stacked film,
the lower stacked film includes a plurality of films having different thermal expansion coefficients, and
a film having a largest thermal expansion coefficient among the plurality of films is formed below a thickness center of the lower stacked film.

2. The thermal sensor device according to claim 1, wherein
a silicon oxide film and a silicon nitride film are alternately formed on the lower stacked film, and
a film thickness of the silicon oxide film of a lowermost layer of the lower stacked film is smaller than a film thickness of the silicon oxide film as an uppermost layer of the lower stacked film.

3. The thermal sensor device according to claim 2, wherein
at least two silicon nitride films are formed on the lower stacked film, and
a film thickness of a silicon oxide film sandwiched between two silicon nitride films of the lower stacked film is smaller than a film thickness of the silicon oxide film as the uppermost layer of the lower stacked film.

4. The thermal sensor device according to claim 1, wherein
the upper stacked film includes a silicon oxide film and a silicon nitride film, and
the film thickness of the silicon nitride film included in the upper stacked film is smaller than the film thickness of the silicon nitride film included in the lower stacked film.

5. The thermal sensor device according to claim 3, wherein a film thickness of a silicon nitride film of the lowermost layer among a plurality of silicon nitride films included in the lower stacked film is the largest.

* * * * *